United States Patent

[11] 3,537,479

| [72] | Inventor | Merritt J. Nelson<br>Grand Rapids, Michigan (13121 Paine Ave., Sparta, MI 49345) |
|---|---|---|
| [21] | Appl. No. | 681,628 |
| [22] | Filed | Nov. 9, 1967 |
| [45] | Patented | Nov. 3, 1970 |

[54] SINGLE LEVER MIXING VALVE
15 Claims, 8 Drawing Figs.

[52] U.S. Cl. .................. 137/636.4,
137/315, 137/597, 137/607, 137/610
[51] Int. Cl. ................................. F16k 11/14
[50] Field of Search........................... 137/636,
636.4, 625.4, 625.42, 607, 610, 315, 597

[56] References Cited
UNITED STATES PATENTS

| 3,358,715 | 12/1967 | Garvin | 137/636.4 |
| 3,393,706 | 7/1968 | Burhop | 137/637.2 |
| 543,149 | 7/1895 | Fiedler | 137/636.4X |
| 1,500,694 | 7/1924 | Whidden | 137/636.3X |
| 2,205,684 | 6/1940 | Cochran | 137/636.2 |
| 2,387,006 | 10/1945 | Buchanan | 137/636.4X |
| 2,575,940 | 11/1951 | Brown | 137/607X |
| 2,923,315 | 2/1960 | Bletcher | 137/636.1X |

*Primary Examiner*—Clarence R. Gordon
*Attorney*—Price, Heneveld, Huizenga & Cooper

ABSTRACT: This disclosure relates to a single lever mixing valve such as used to dispense water, wherein a single lever controls the flow of relative portions of hot and cold water from a single outlet. The valve has a longitudinal cam which forces ball valves against valve seats in inlet ports.

Patented Nov. 3, 1970 3,537,479

INVENTOR.
MERRITT J. NELSON
BY Price, Heneveld,
Huizenga & Cooper

Patented Nov. 3, 1970
3,537,479
Sheet 2 of 2
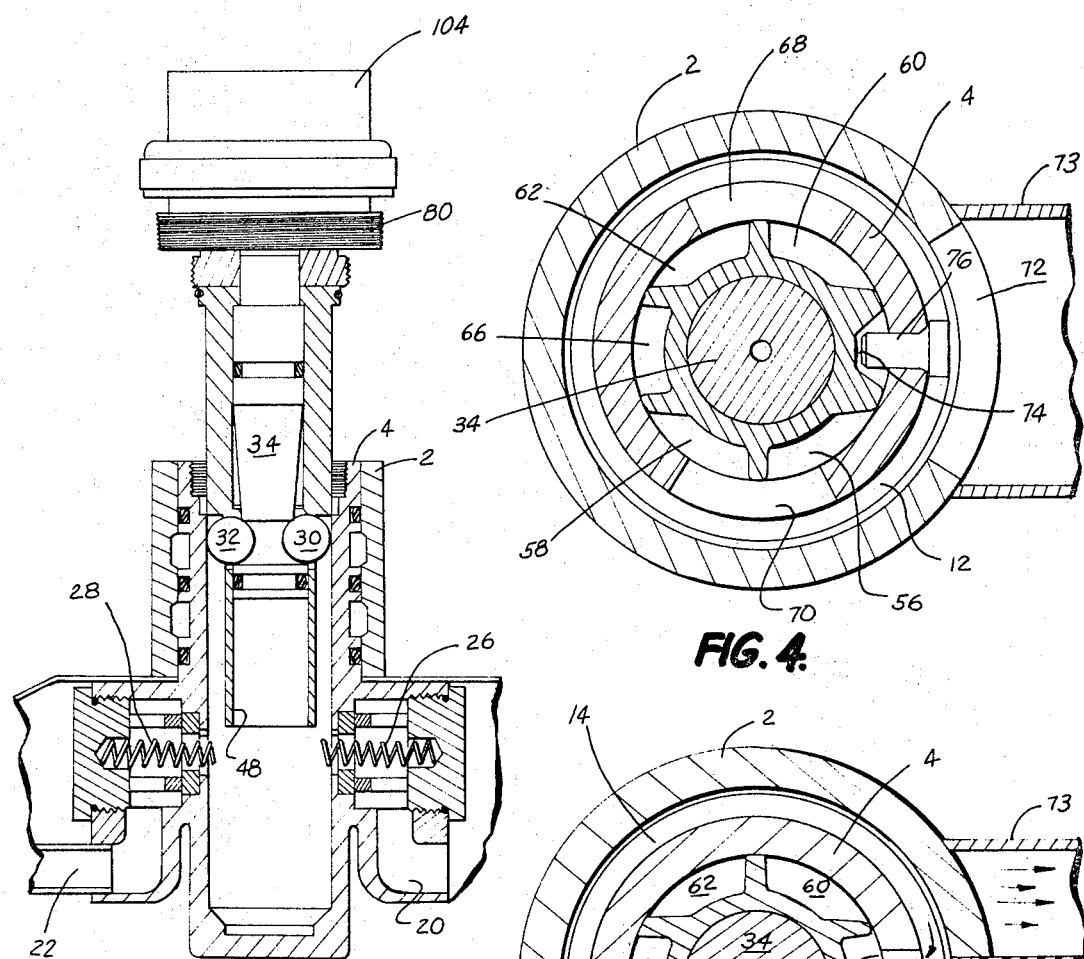
FIG. 6.
FIG. 4.
FIG. 5.
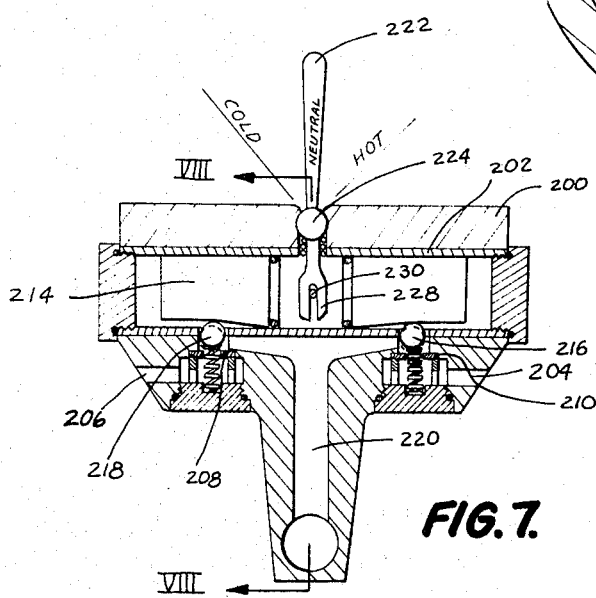
FIG. 7.
INVENTOR.
MERRITT J. NELSON
BY Price, Heneveld,
Huizenga & Cooper

SINGLE LEVER MIXING VALVE

This invention relates to a single lever mixing valve. In one of its aspects it relates to a single lever mixing valve comprising a valve chamber, at least two inlet means for two different fluids extending into the valve chamber, valve seats in the inlet means, ball valves in the inlet means positioned adjacent the valve seats and downstream therefrom, and cam means adjacent the ball valves forcing the ball valves against the valve seats, the cam being rotatable about an axis substantially perpendicular to the axis of the inlet means and the cam being reciprocatable along the cam axis, and wherein the cam surface is so shaped that the rotation of the cam about the axis and the reciprocation of the valve actuate the flow of fluid through the valve and the relative amount of fluid flowing through each of the inlet means.

In another of its aspects the invention relates to a single lever mixing valve as hereinbefore described, wherein the cam is tapered along the axis of rotation and is eccentric in a section perpendicular to the axis such that rotation of the cam varies the relative proportions of the fluid entering through each inlet means, and the reciprocation of the cam varies the amount of fluid flowing from the valve.

In another of its aspects the invention relates to a single lever mixing valve as has been hereinbefore described, wherein the cam is tapered about the axis of rotation and has a varying radius along the axis of rotation such that the reciprocation of the valve along the axis varies the relative proportions of fluid passing through the inlet means, and rotation of the valve about the axis varies the amount of fluid flowing from the valve.

Single lever mixing valves are well known and many are currently available. Some of these valves available do not possess an adequate control of volume variation. Others which exhibit smoothness of operation, including adequate control of volume variation, are expensive as requiring a multitude of parts. Other valves corrode and alkaline deposits form on the moving parts due to electrolytic action between the metal parts. Still other valves are so constructed that the replacement and repair of wornout parts is difficult and expensive. Still other valves exhibit variations in volume for a given setting due to temperature changes in the fluid passing through the valve.

Griffith, U.S. Pat. No. 2,679,865, discloses a mixing faucet in which a cam actuates two valve members which are seated against valve seats by the pressure of water through a pair of inlet sources. The rotation of the cam varies the relative proportions of water entering through the inlet ports and the reciprocation of the valve varies the volume of water flowing through the valve. The closing of these valves is dependent on the water pressure and the snugness of fit between the valve members and the valve seat. Removable plugs are provided adjacent the valve members to remove the same when they become worn out.

Spencer, U.S. Pat. No. 2,792,847, discloses a mixing valve in which a spherical cam actuates valve members which are spring biased closed in a pair of inlet ports. The spherical valve is complicated to manufacture and does not provide an accurate control of the volume of water flowing from the valve. Further, the replacement of wornout valve parts is difficult.

Bletcher et al., U.S. Pat. No. 2,923,315, disclose a single lever mixing valve in which an eccentric and reciprocatable cam forces ball valves against valve seats to close off water flowing into the valves. The axis of the inlet ports is aligned with the cam such that the water pressure tends to force the cam away from the closed position. Further, a slight movement of the cam in the axial direction tends to produce a corresponding large change in the volume of water flowing through the valve.

I have now discovered a single lever mixing valve which is simple in construction and which avoids the prior art problems by employing replaceable ball valves which are forced against valve seats by a cam which is reciprocatable in a direction substantially perpendicular to the direction of fluid flow.

By various aspects of this invention, one or more of the following or other objects can be obtained.

It is an object of this invention to provide a single lever mixing valve in which a cam forces ball valves against valve seats by such construction that the force of the water pressure does not tend to move the cam surface so as to open the valve.

It is a still further object of this invention to provide a cam operated, single lever mixing valve wherein the force exerted by water pressure against the cam surface has substantially no component of force in the direction of axial cam reciprocation.

It is yet another object of this invention to provide an inexpensive, single lever operated mixing valve having smooth operation and relatively fine volume variation characteristics.

It is still another object of this invention to provide a single lever mixing valve in which fluid flow remains substantially constant regardless of a change in temperature of the fluid passing therethrough.

It is still another object of this invention to provide a single lever mixing valve in which wear is minimized by eliminating metal-to-metal contact of moving parts.

It is still another object of this invention to provide a single lever mixing valve in which alkaline deposits on valve portions due to electrolytic action are substantially eliminated.

Other aspects, objects, and the several advantages of this invention are apparent to one skilled in the art from a study of this disclosure, the drawings, and the appended claims.

According to the invention there is provided a single lever mixing valve having a valve chamber with at least two inlet valve seats. Ball valves are positioned in the inlet ports downstream of the valve seats. A cam is positioned in the valve chamber and forces the ball valves against the valve seats, the cam is rotatable about an axis substantially perpendicular to the axis of the inlet ports, and the cam is reciprocatable about the cam axis. The cam surface is so shaped that rotation of the cam about the cam axis and reciprocation of the cam will permit regulation of flow of fluid through the valve and will control the relative amounts of fluid flowing through the two inlet ports. An outlet is provided in the valve chamber and means are provided connecting the inlet ports to the outlet.

Preferably, the cam is tapered along the axis of rotation and is eccentric in cross section such that the rotation of the cam varies the relative proportions of fluid entering the inlet ports and the reciprocation of the cam varies the amount of fluid flowing from the valve.

In a preferred embodiment of the invention, the valve chamber contains a valve sleeve and the cam slides within the valve sleeve. An end portion of the cam has a reduced diameter portion and an outwardly extending lip below the reduced diameter portion such that the ball valves can be removed from the valve chamber when the ball valves are in the reduced diameter portion of the valve by simply removing the valve and the cam axially from the valve chamber. The valve sleeve is provided with apertures adjacent the inlet ports to permit the ball valves to communicate with the cam and to be retained by the valve sleeve when the valve sleeve is removed from the valve housing.

In a second embodiment of the invention, the cam surface is tapered about the axis of rotation and has a varying radius along the axis of rotation such that reciprocation of the valve along the axis varies the relative proportions of the fluid passing through the inlet means and rotation of the valve about the axis varies the amount of fluid flowing from the valve.

The invention will now be described with reference to the accompanying drawings in which:

FIG. 1 is a sectional view through a novel valve structure showing one embodiment of the invention;
FIG. 2 is a sectional view along lines II–II of FIG. 1;
FIG. 3 is a sectional view along lines III–III of FIG. 1;
FIG. 4 is a sectional view along lines IV–IV of FIG. 3;
FIG. 5 is a sectional view along lines V–V of FIG. 3;

FIG. 6 is a sectional view similar to FIG. 1 showing the method of removing and replacing the ball valve members;

FIG. 7 is a sectional view of a second embodiment of the invention; and

Figure 1:
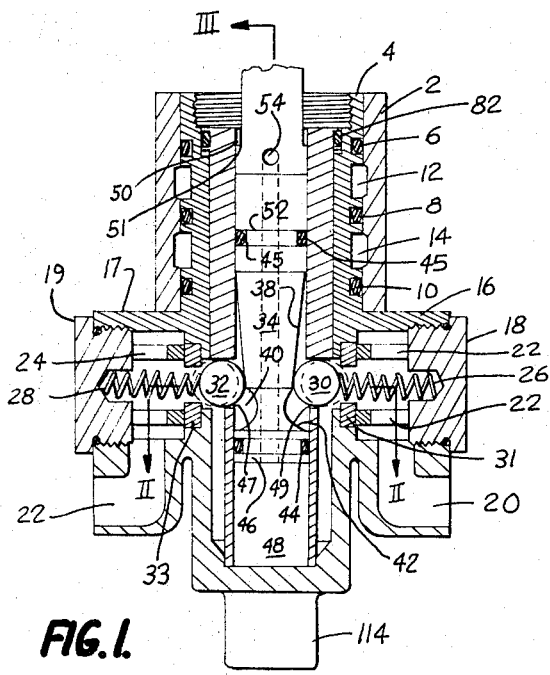

Referring now to FIGS. 1 through 5, and to FIG. 1 in particular, a spout collar 2 has positioned therein a valve housing 4 having O-rings 6, 8, and 10 to separate annular chambers 12 and 14. The valve housing has a pair of fluid inlet portions 16 and 17 for fluid inlet channels 20 and 22. Each of the inlet portions has a plug 18 and 19 which engage inlet portions 16 and 17, respectively. The plugs 18 and 19 contain an inner annular portion having openings 22 and 24. The inner annular portions abut against valve seats 31 and 33 in the respective inlet ports.

The inlet ports are provided with ball valves 30 and 32 which are forced against valve seats 31 and 33, respectively by cam surface 38 on cam member 34. Springs 26 and 28 bias ball valves 30 and 32 against the cam surface 38. The ball valves 30 and 32 are free to move back and forth in the inlet ports as shown by phantom lines, and are positioned at least in part in apertures 47 and 49 of a valve sleeve 36.

Figure 2:
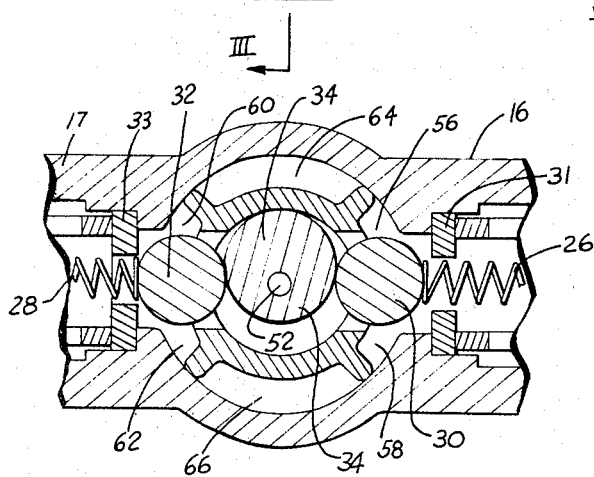

As can be seen from FIG. 2 in conjunction with FIG. 1, cam member 34 is eccentric in cross section and so shaped that rotation of cam member 34 will vary the relative amounts of fluid, such as hot or cold water entering through the respective inlet ports, and the reciprocation of the cam member 34 within the valve sleeve 36 regulates the total amount of fluid entering the valve.

Valve sleeve 36 contains a plurality of vertical channels 56, 58, 60, and 62, which extend vertically and communicate with the inlet ports. A plurality of vertical ribs separate these channels from vertical channels 64 and 66.

As seen in FIG. 4, vertical channels 56, 58, 60, and 62 communicate with annular channel 12 through openings 68 and 70 in valve housing 4. The fluid is then free to flow from annular channel 12 into faucet 73 through outlets 72 in the spout collar 2.

The top portion of vertical channel 64 is tapered to form a narrow slot 74 to form a centering slot for pin or screw 76 which is fastened in housing 4.

Referring now again to FIG. 1, the cam 34 contains a reduced diameter portion 40 and an outwardly extending lip 42 beneath the reduced diameter portion 40. An O-ring is positioned between flange 46 on the bottom of the cam member and outwardly extending lip 42. A second O-ring 45 is positioned on the upper portion of cam member 34, and thereby closes off the central, or operating portion of the cam. An upper chamber 50 is provided between a shoulder 51 and the top portion of valve sleeve 36. A bore 52 having an outlet 54 into chamber 50 provides a communication between chamber 48 beneath the cam member, and chamber 50 above the cam member. Thus, when the cam member reciprocates within the valve sleeve 36, fluid in chamber 48 will be passed to chamber 50 and vice versa.

Figure 3:
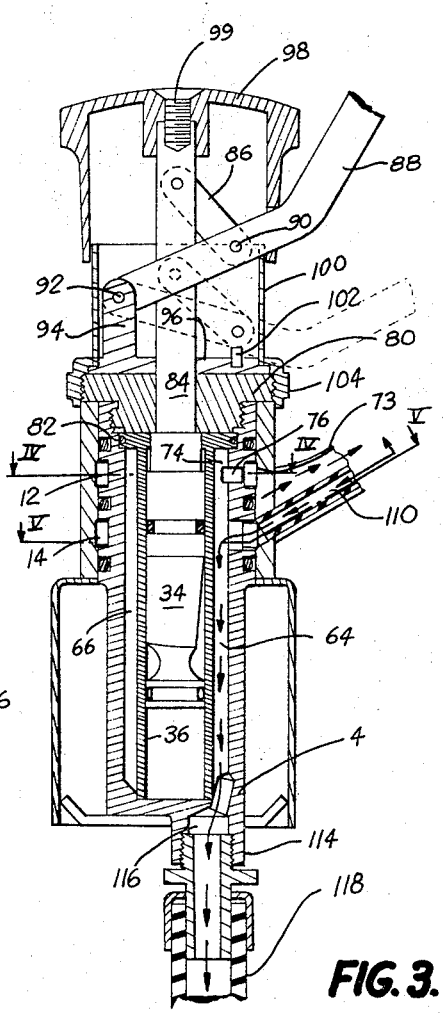

As can be seen in FIG. 3, a valve operating stem 84 is connected to the top portion of cam member 34 to actuate the reciprocation and rotation of the cam member. Operating stem 84 is in turn connected to linkage 86 and to a top housing 98 through screw 99. An operating lever 88 is connected to linkage 86 at 90 and is also connected to post 94 at pin 92 of circular plate 96. The circular plate 96 is rotatable about operating stem 84 and on cap member 80. Thus, as operating lever 88 is rotated about operating stem 84, plate 96 will rotate, operating stem 84 and cam member will also rotate to vary the relative proportions of fluid entering the valve through lines 20 and 22. As the operating lever 88 is moved upwardly and downwardly (the extent of downward movement being shown in phantom lines in FIG. 3), the operating stem 84 and the cam 34 will accordingly reciprocate in a vertical direction relative to FIG. 3. This reciprocation will vary the amount of total fluid passing into and out of the valve.

An adjustable pin 102 can be provided on circular plate 96 to abut against operating lever 88 or connecting link 86 to limit the downward extent of cam member 34.

The faucet 73 contains a return fluid flow conduit 110 which communicates through annular channel 14, opening 112 in valve sleeve 14 and vertical channel 64 with a spray hose 118. An opening port 116 in a spray hose connection 114 at the bottom portion of housing 4 provides an opening for attachment of the spray hose 118. The end of the faucet 73 contains a diverter (not shown) which will divert the fluid flowing through faucet 73 into tube 110. See FIGS. 3 and 5. The diverter is a standard item which can be purchased from Modern Faucets, 1700 E. 58th Place, Los Angeles, California, as model 407.

The diverter will operate to divert the flow from flowing out of faucet 16 and into tube 110 when the pressure in tube 110 drops and fluid starts to flow downwardly in channel 110. This occurs when spray hose 118 is opened.

In operation, when the cam member 34 is rotated, the relative proportions of fluid such as hot and cold water entering the valve through lines 20 and 22 are varied. When the cam is raised, the fluid enters through valve seats 31 and 33 in the predetermined proportions determined by the position of cam 34. The fluid then passes upwardly through the channels 56, 58, 60, and 62 through annular channel 12 and out faucet 73 through opening 72. When the cam is moved downwardly, the cam surface 38 forces ball valves 30 and 32 against the cam seats 31 and 33, thereby providing a positive seating of the valve against the valve seat. As can be seen in FIGS. 1 and 2, the axis of the inlet ports is substantially perpendicular to the direction of reciprocation of cam member 34. Thus, the pressure of the water in ball valves 30 and 32 cannot force the cam member 34 to open the valve. Further, the gradual sloping nature of surface 38 provides a substantial control of the volume of fluid dispensed from the valve.

Preferably, the valve housing 4 is metallic in composition and is cast from a material such as copper or brass. The valve seats 31 and 33 can be made out of rubber, plastic, or metal. However, in the preferred embodiment of the invention they are made out of a rubbery material such as neoprene, or they can be made out of a temperature-insenitive plastic material such as polytetrafluoroethylene, synthetic rubber, polyethylene, polypropylene, acetal resins, cellulose acetate, and other cellulose derivatives. Examples of these materials are Teflon, Celcon, or Noryl. Buna-N is the preferred material.

The novel valve sleeve employed in the invention is preferably made from a temperature-insensitive plastic resin having self-lubricating properties such as, for example, polyethylene, polypropylene, polytetrafluoroethylene, acetal resins, and cellulose derivatives. Preferably acetal resins such as Delrin and Celcon are employed.

The ball valves 30 and 32 of the invention can be made from any suitable material, but preferably are made from a temperature-insensitive plastic resinous material having self-lubricating properties, such as Celcon, Delrin, Teflon, or Nylon. In a preferred embodiment of the invention, acetal resins are used.

Celcon is a trademark for acetal resins and molding compounds sold by Cellulose Plastics Company, and Delrin is a similar resin sold by E. I. DuPont Company. Noryl is a similar resin sold by General Electric Corporation.

The cam member 34 can be cast out of any suitable metallic material such as brass, copper and the like.

Thus, as can be seen from the foregoing description, the novel valve assembly according to the invention omits metal-to-metal contact in the moving parts, thereby reducing wear of the valve assembly. Further, there are relatively few parts employed in the valve assembly and a substantial portion of those parts are made from inexpensive plastic resinous materials.

The elimination of metal-to-metal contact and the use of the plastic resinous parts, substantially eliminates alkaline deposits due to electrolytic action.

Whereas the invention has been described with regard to a lever for actuating the reciprocation and rotation of the cam member 34, it is obvious that it is within the scope of the invention to employ a handle directly attached to operating rod 84.

Referring now to FIG. 6, there is shown the ease with which the ball valves 30 and 32 can be replaced. When it is desirable to replace the ball valves 30 and 32, exterior collar 104 and cap member 80 are unscrewed. The water is cut off, operating rod 84 is raised upwardly to position the area of reduced diameter 40 of cam member 34 opposite the openings 47 and 49 in valve sleeve 36. The action of the springs 26 and 28 forces the ball valves 30 and 32 into the area of reduced diameter 40 of cam member 34. Whereas the springs 26 and 28 are not necessary for the operation of the invention, they are preferred in that they aid in the placement of ball valves 30 and 32. The springs serve to break any vacuum in the inlet ports from lines 20 to 22 when the water in those lines is cut off and the valve is disassembled to remove the ball valves. Further, as has been hereinbefore mentioned, the springs push the ball valves 30 and 32 into the reduced diameter portion of cam 34. The cam 34 and the valve sleeve 36 are then raised together with ball valve 30 positioned in slots 47, 49, and in reduced diameter 40 of cam 34. When removed from the valve housing 4, the ball valves 30 and 32 will fall out of slots 47 and 49 and can be replaced by new valves. The assembly is then pushed down into the valve housing and plug 80 and cap 104 are screwed in place. The water can then be turned on and the valve is ready for operation again.

When the valve seats 31 and 33 wear out, which will be substantially less frequent than ball valves 30 and 32, they can be replaced by simply unscrewing caps 18 and 19 (after the water has been cut off). The valve seats 31 and 33 can then be replaced and the caps 18 and 19 are then screwed back in place for operation of the valve assembly.

Figure 8:
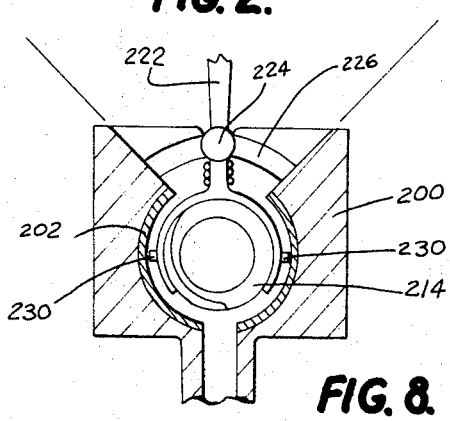
FIG. 8 is a sectional view through lines VIII–VIII of FIG. 7.

FIG. 7 shows another embodiment of the invention wherein the cam member is tapered around its circumference and the radius varies axially so that the reciprocation of the cam member varies the relative portions of fluids entering through different inlet ports and the rotation of the cam varies the amount of fluid passing through the valve. Referring specifically to FIG. 7, there is provided a valve housing 200 having a valve sleeve 202 with inlet ports 203 and 205. The inlet ports are respectively connected to lines 204 and 206 which, for example, can supply hot and cold water. Positioned within the inlet lines are valve seats 208 and 210, having ball valves 218 and 216 respectively abutting against them. Cam member 214 forces the ball valves 218 and 216 against valve seats 208 and 210, respectively. As can be seen from FIG. 8, the cam is tapered about the axis of rotation at 215 such that the rotation of cam 214 will permit the ball valves 216 and 218 to be removed from their valve seats, thereby allowing fluid to pass into the valves. As can be seen from FIG. 7, the cam has a tapered radius along the axis from the central portion toward each end, such that the reciprocation of the cam member 214 will vary the relative proportions of hot and cold water entering the valve. An outlet 220 is provided adjacent the valves 216 and 218 (in a manner similar to that shown in the embodiment of FIGS. 1 through 6 is provided) for dispensing the fluid. A handle having a ball pivot 224 actuates the movement of cam member 214. The ball pivot 224 can rotate about a line perpendicular to the axis of cam 214 and can slide in track 226 to rotate the cam about its longitudinal axis. The handle has a pair of cams 228 which engage pins 230 to transfer the movement of handle 222 to cam 214.

Reasonable variation and modification are possible within the scope of the foregoing disclosure and the drawings without departing from the spirit of the invention.

I claim:

1. A single lever mixing valve comprising:
 a valve chamber;
 at least two inlet means for different fluids extending into said chamber;
 valve seats in said inlet means;
 ball valves in said inlet means positioned adjacent but downstream from said valve seats;
 cam means adjacent said ball valves forcing said ball valves against said valve seats, said cam being rotatable about an axis substantially perpendicular to the axis of said inlet means, said cam being reciprocatable along said cam axis, said cam surface being so shaped that the rotation of said cam about said axis and the reciprocation of said valve actuates flow of fluid to said valve and controls the relative amount of fluid flowing through said two inlet means; and
 an outlet means in said valve chamber communicable with said inlet means.

2. A single lever mixing valve according to claim 1, wherein said cam is tapered along said axis of rotation and is eccentric about said axis of rotation in a section perpendicular to said axis, such that rotation of said cam varies the relative proportions of fluid entering through said inlet means and reciprocation of said cam varies the amount of fluid flowing through said valve.

3. A single lever mixing valve according to claim 2, wherein said valve chamber contains a valve sleeve and said cam slides within said valve sleeve, an end portion of said cam has a reduced diameter portion and an outwardly extending lip below said reduced diameter portion, such that said ball valves can be removed from said valves chamber when said ball valves are in said reduced diameter portion of said valve, by removing said valve sleeve and said cam from said valve chamber.

4. A single lever mixing valve according to claim 3, wherein removable means are provided at an end of said valve chamber to maintain said sleeve and said cam within said valve chamber, such that removal of said removable means will permit withdrawal of said sleeve, cam, and ball valves.

5. A single lever mixing valve according to claim 3, wherein said valve sleeve has fluid inlet ports adjacent said inlet means to allow said ball valves to move therein when actuated by said cam, said sleeve forming an annular channel between said sleeve and said valve chamber adjacent an outlet means in said valve, and channel means are formed by said sleeve and said valve chamber between said inlet means and said annular channel.

6. A single lever mixing valve according to claim 5, wherein said valve chamber has a second outlet beneath said first outlet, and said first outlet has a conduit within said outlet means and means to divert fluid flowing out of said first outlet through said conduit back to said valve chamber, and said sleeve forms a second channel means between said conduit and said second outlet means.

7. A single lever mixing valve according to claim 1, wherein removable means are provided axially of said valve seat in said inlet means forming part of said inlet means, whereby removal of said removable means permits easy access to said valve seats for replacement thereof.

8. A single lever mixing valve according to claim 1, wherein biasing means extending through said inlet means are provided to maintain said ball valves against said cam surface, even in the absence of fluid pressure in said inlet means.

9. A single lever mixing valve according to claim 1, wherein said cam is radially tapered about said axis of rotation and has a varying radius along said axis of rotation, the cam being so shaped that reciprocation of said valve along said axis varies the relative portions of fluid passing through said inlet means and rotation of said valve about said axis varies the amount of fluid flowing from said valve.

10. A single lever mixing valve according to claim 1, wherein said ball valves are made of a relatively temperature-insensitive resinous material.

11. A single lever mixing valve according to claim 3, wherein said valve sleeve is made from a relatively temperature-insensitive resinous material.

12. A single lever mixing valve according to claim 11, wherein said ball valves and said valve seats are made from a relatively temperature-insensitive resinous material.

13. A single lever mixing valve according to claim 11, wherein said resinous material is a polymer of tetrafluoroethylene.

14. A single lever mixing valve according to claim 10, wherein said resinous material is nylon.

15. A single lever mixing valve comprising:
- a valve chamber;
- at least two inlet means for different fluids extending into said chamber;
- valve seats in said inlet means;
- ball valves in said inlet means positioned adjacent but downstream from said valve seats;
- cam means adjacent said ball valves forcing said ball valves against said valve seats, said cam means being rotatable and reciprocable about a given axis, the surface of said cam means being so shaped that the rotation of said cam about said axis and the reciprocation of said valve actuates flow of fluid to said valve and controls the relative amount of fluid flowing through said two inlet means;
- an outlet means in said valve chamber communicable with said inlet means; and
- biasing means extending through said inlet means to maintain said ball valves against said cam surfaces, even in the absence of fluid pressure in said inlet means.